Aug. 4, 1959
E. M. SIZEMORE
2,897,973
DISH AND UTENSIL DRIER
Filed April 8, 1957
2 Sheets-Sheet 1
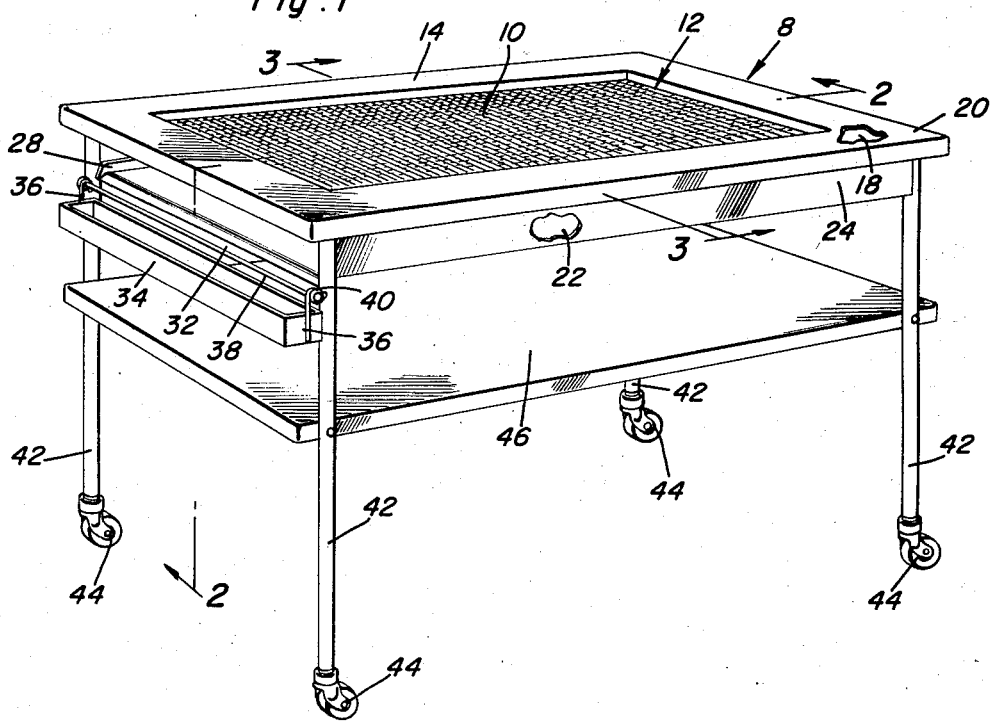
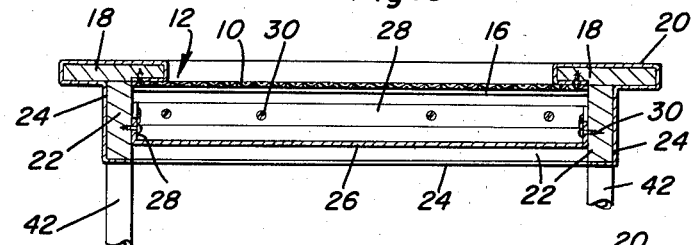
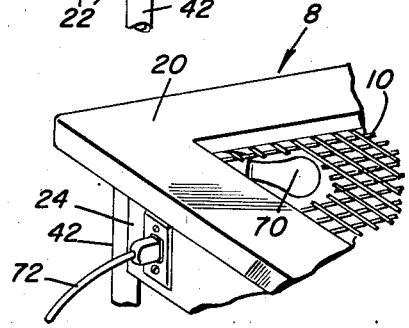
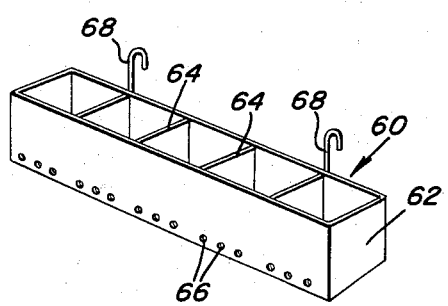
Ethel M. Sizemore
INVENTOR.
BY *Clarence A. O'Brien*
*and Harvey B. Jackson*
Attorneys Aug. 4, 1959     E. M. SIZEMORE     2,897,973
DISH AND UTENSIL DRIER
Filed April 8, 1957     2 Sheets-Sheet 2

Ethel M. Sizemore
INVENTOR.

ically, note some of the state of the art with respect to the invention and its uses and adaptations.

United States Patent Office 2,897,973
Patented Aug. 4, 1959

2,897,973

DISH AND UTENSIL DRIER

Ethel M. Sizemore, Sturgeon, Ky.

Application April 8, 1957, Serial No. 651,462

4 Claims. (Cl. 211—41)

The present invention relates to a structurally novel, practical and highly useful table which is expressly designed and appropriately adapted to assist a user thereof in conveniently assembling and drying utensils after they have been cleaned and washed, for example, such utensils as cups, saucers, various and all kinds of plates and other items which may be broadly covered as silver.

Although the table may be successfully utilized in the home it is primarily, although not necessarily, intended for use in restaurant, hotel and similar large kitchens where numerous utensils are commonly washed and dried for repeated use and where, as a general rule, the various utensils are washed in a sterilizer or the like.

It is a matter of common knowledge that sanitation, wherever soiled dishes and utensils are involved, is of vital importance. This is particularly true in carefully supervised kitchens in public eating places. It is because of this problem that the draining and table herein revealed has been devised. That is to say, the instant concept has to do with a time saving solution of the problem wherein, after the dishes and other utensils leave the sterilizer, they do not need to be touched by hand or wiped with a towel, as is often the practice pursued in small restaurant kitchens.

In carrying out the principles of the invention a structure has been perfected which, it is submitted, will meet manufacturing requirements and economies of manufacturers, will appeal to restaurant and hotel owners, and, what is more important, will meet the time and labor saving needs of dishwashers and others who are called upon to devote time and attention to this everyday chore.

Briefly, the invention in its preferred embodiment is characterized by a mobile leg supported table or stand. This is a preferred aspect of the invention in that it makes it possible for users to move and shift the table whenever and wherever necessary while it is being used or when it is not in use and located in some out-of-the-way place.

The means at the upper portion of the table structure is significant and is characterized by an openwork grill, preferably a strong screen of appropriate mesh which is marginally surrounded by a rectangular or an equivalent frame. A slightly inclined drip and drain pan is fixedly mounted directly beneath the screen. This is provided at one end with a depending lip which empties into a readily attachable and detachable trough or similar receptacle supported on the table for cooperation with the pan.

Novelty is also predicated on a screen which is sufficient in size to accommodate a relatively large openwork dish rack. The dish rack, when loaded, is placed atop the screen and supports at one end a silver rack, that is, a holder for knives, forks, spoons and the like. Other objects, features and advantages of the invention will become more readily apparent from the following description and the accompanying drawings.

In the drawings wherein like numerals are employed to designate like parts throughout the views:

Figure 1 is a perspective view of a mobile utensil accommodating, ventilating and drying table constructed in accordance with the principles of the present invention;

Figure 3 is a cross-section of a fragmentary type taken on the plane of the line 3—3 of Figure 1;

Figure 4 is a perspective view of the readily applicable and removable silver rack;

Figure 6 is a perspective view of a modified corner portion of the table showing how, if desired, simple lamp bulbs may be installed at each corner and used as a heat source for quicker drying results.

Figure 2:
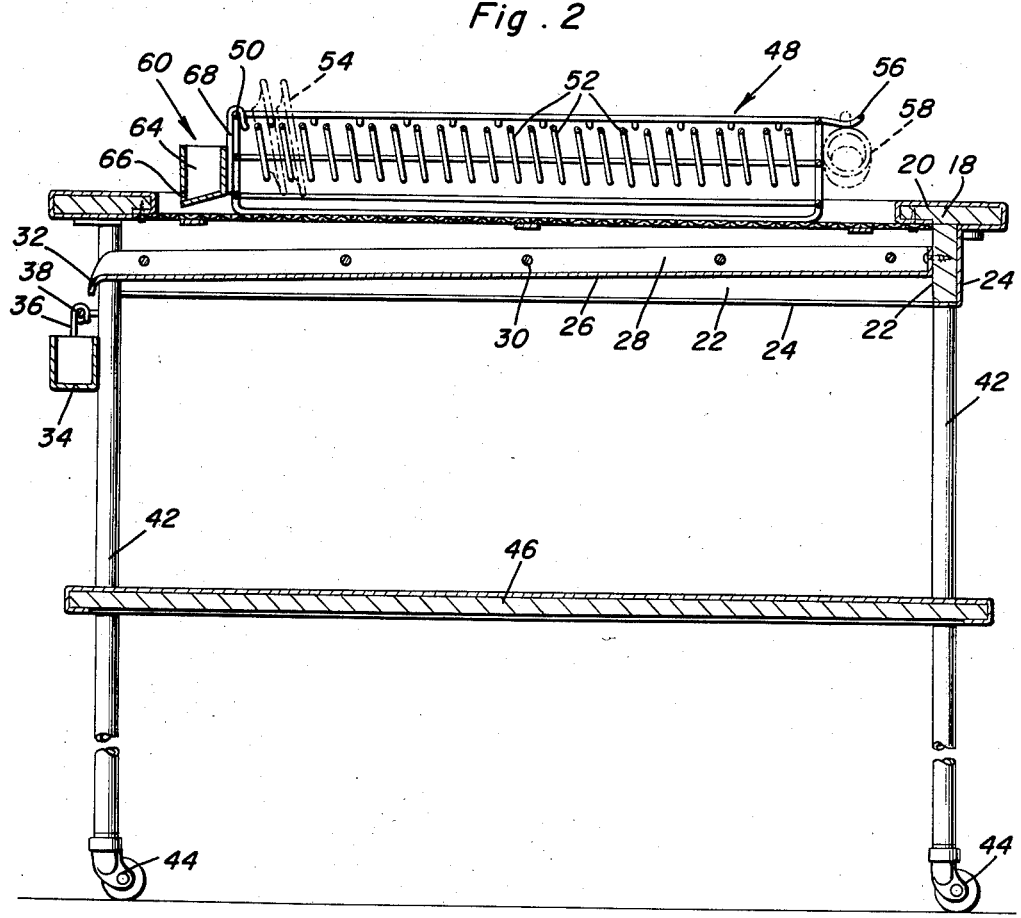
Figure 2 is a view on a slightly enlarged scale which is taken approximately on the plane of the line 2—2 of Figure 1, looking in the direction of the arrows, and showing the dish rack and silver rack supported atop the screen.

Referring now to the drawings with the aid of reference numerals and accompanying lead lines and with reference in particular to Figures 1 to 3, inclusive, it will be seen that the table top, as a structural entity, is denoted by the numeral 8. Broadly it comprises an openwork grill, preferably a wire mesh screen, which is denoted at 10 and which spans and therefore covers the substantially rectangular opening 12 defined by the inner marginal portions of the surrounding rectangular frame 14. In actual practice this frame will be preferably made of stainless steel and the screen will likewise be designed for strength and ventilation purposes according to the requirements of manufacturers. Here the screen is shown fastened around its marginal edges to the underneath side of the frame and brace strips 16 are employed and extend beneath the screen and are fastened to the frame as brought out in Fig. 3. Also as seen in this figure, in the form of the invention illustrated, the frame may be of wood members 18 enclosed or encased in an aluminum or stainless steel or suitable metal jacket 20. This jacket also encloses the depending vertical rails or members 22 and this portion of the metal covering or jacket is denoted at 24 in Fig. 3. The covered rails or members 22 define what is here referred to conveniently as an apron or skirt and this is intended to partly hide as well as suspend the aforementioned shallow slightly inclined drip catching and drainage pan 26. The pan underlies the screen and has marginal flanges 28 secured by screws or other fasteners 30 to the horizontal members 22. It is to be noted in Fig. 1 that the apron is open at the left hand end. Also, the drip pan is open at this end and is provided here with a deflected or depending lip or flange 32 which discharges drainage water, if any, into the open top elongated box-like trough 34. The trough has hook-like anchors 36 at its ends which engage over a suspension rod 38. The suspension rod has its end portions fastened in screw eyes or the like 40 carried by the upper portions of the vertical supporting legs 42. The legs are attached to their respective corner portions of the over-all table and are provided with swivelly mounted casters or rollers 44 at their lower ends. Underlying the pan is a suitably covered shelf 46. This is used for stacking (not shown) ready-to-use utensils.

Figure 5:
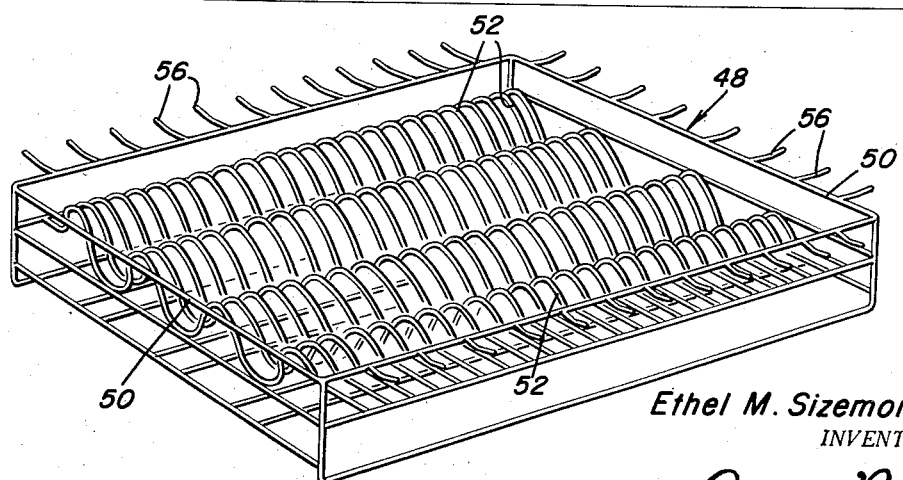
Figure 5 is a perspective view of the dish rack.

As before mentioned the invention also embodies as a component thereof a suitably constructed openwork dish rack which is denoted by the numeral 48 (Figs. 2 and 5). This has marginal frame members 50 and dividers or separators 52 to accommodate the dishes 54 in the manner shown in dotted lines at the left in Fig. 2. The projecting prong-like members 56 serve obviously to suspend handle-equipped cups or the like 58.

The rack for knives, forks, spoons and other "silver" is denoted generally by the numeral 60 in Fig. 4. This is an elongated box-like container 62 having dividers or partitions 64 defining individual cells or pockets for the knives, forks, spoons and so on.

Although the silver rack may be of some other construction it is generally in the form shown and what may be described as the front wall is provided with a multiplicity of discharge ports or orifices 66 which drain close to the end portion of the screen in the manner seen at the left in Fig. 2. Suitable hook-like hangers 68 are also provided and these are attached to and hung from one of the frame members 50 at the left also as seen in Fig. 2.

There has long existed a need in busy restaurant kitchens for appropriate equipment to expedite the recurring step of drying. Actual experience shows that when dishes and the like are removed from the sterilizer (not shown) they usually dry rapidly. Nevertheless in the overall batch of utensils a certain amount of dripping is necessary to cope with. Consequently, by removing the dish filled rack from the sterilizer and placing it on the screen as seen in Fig. 2 takes care of whatever drainage and drippage that may be encountered. Also, the moisture collected in the pan is gravitated from the pan and is allowed to flow over the deflected lip 32 into the trough 34. The trough is detachably mounted and may be removed and emptied from time to time in an obvious manner. As a general rule two or more silver racks 60 may be employed and suspended one at a time directly from the dish rack. Therefore, both of the racks are accommodated by the one simple supporting, ventilating and drainage screen 10. It will be clear, therefore, that the invention herein revealed constitutes a simple, highly efficient and practical device which well serves the purposes for which it is intended.

With reference to Fig. 6, note that the concept contemplates the use of four lamp bulbs 70 suitably mounted and receiving current from a conductor cord 72 thus providing a heat source for rapid drying results.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A drying table for sterilized domestic utensils such as dishes, silverware and the like comprising a horizontal table top embodying an article supporting screen marginally surrounded by a cooperating rigid horizontal frame, vertical roller-equipped legs attached to corner portions of said frame, vertical rail members supported between the legs in a plane below the bottom side of said frame and defining a depending skirt, said skirt being open at one end just beneath the corresponding end of said frame, an inclined drip-collecting-gravity-draining pan supported beneath said screen and frame and within the confines of and hidden by said skirt, the lower end of said pan being open and having a downwardly bent drainage deflecting lip, and a trough removably supported from adjacent legs and in communicative alignment with the open end of said pan.

2. A drying table for sterilized domestic utensils such as dishes, silverware and the like comprising a horizontal table top embodying an article supporting screen marginally surrounded by a cooperating rigid horizontal frame, vertical roller-equipped legs attached to corner portions of said frame, vertical rail members supported between the legs in a plane below the bottom side of said frame and defining a depending skirt, said skirt being open at one end just beneath the corresponding end of said frame, an inclined drip-collecting-gravity-draining pan supported beneath said screen and frame and within the confines of and hidden by said skirt, the lower end of said pan being open and having a downwardly bent drainage deflecting lip, and a trough removably supported from adjacent legs and in communicative alignment with the open end of said pan, and a dried article stacking and temporary storage shelf fixedly mounted by and on said legs in general spaced parallelism below the bottom of said pan.

3. For use in a restaurant kitchen or elsewhere, a mobile table embodying a leg-supported frame having a horizontal miscellaneous article supporting and drying, drip trapping and drip disposal pan supported in an inclined gravity-draining position directly beneath a screen and open at one end, a dish stacking and storing shelf fixedly mounted in spaced general parallelism below the bottom of said pan, a hanger rod horizontally fixed and disposed on a plane below and in alignment with an open end of said pan, and a drainage water collecting trough detachably suspended from said rod and in alignment with the open end of said pan.

4. For use in a restaurant kitchen or elsewhere, a portable table embodying a horizontally disposed frame marginally attached to and circumscribing a screen of sufficient rigidity form to temporarily support hot dishes, tableware and utensils which have been removed from a sterilizer for drainage and drying, rails attached to and depending from the bottom of the several components of said frame and joined at their ends to supporting legs which are attached to and depending below the corner portions of said frame, said rails cooperating with the frame and defining a pan enclosing skirt, a marginally flanged pan situated within the confines of and hidden by said skirt with its flanges attached to the rails, said pan being on a plane directly beneath said screen and being open at one end and provided at the open end with a drainage deflecting lip, and a source of heat whereby the space between the pan and screen, and which is confined by the encompassing skirt, is heated, said means embodying at least one electrical heating element, supported from the skirt within a corner portion of the skirt.

References Cited in the file of this patent

UNITED STATES PATENTS

| Number | Name | Date |
| --- | --- | --- |
| 591,377 | Bunce | Oct. 12, 1897 |
| 933,180 | Johnson | Sept. 7, 1909 |
| 1,847,256 | Nielsen | Mar. 1, 1932 |
| 2,022,591 | Everitt | Nov. 26, 1935 |
| 2,083,852 | McClanahan | June 15, 1937 |

FOREIGN PATENTS

| Number | Country | Date |
| --- | --- | --- |
| 3,971 | Great Britain | of 1898 |
| 16,635 | Great Britain | of 1909 |